Oct. 26, 1943.　　A. A. GROSSARTH　　2,332,570
GEAR CUTTING MACHINE
Filed March 8, 1940　　5 Sheets-Sheet 1

INVENTOR.
Albert A Grossarth,
BY
ATTORNEYS.

Oct. 26, 1943.   A. A. GROSSARTH   2,332,570
GEAR CUTTING MACHINE
Filed March 8, 1940   5 Sheets-Sheet 2

INVENTOR.
Albert A. Grossarth,
BY
ATTORNEYS.

Oct. 26, 1943.  A. A. GROSSARTH  2,332,570
GEAR CUTTING MACHINE
Filed March 8, 1940  5 Sheets-Sheet 3

Fig.3

INVENTOR.
Albert A. Grossarth
BY
ATTORNEYS.

Oct. 26, 1943.                A. A. GROSSARTH                2,332,570
                            GEAR CUTTING MACHINE
                    Filed March 8, 1940          5 Sheets-Sheet 4

INVENTOR.
Albert A. Grossarth,
BY
ATTORNEYS.

Patented Oct. 26, 1943

2,332,570

UNITED STATES PATENT OFFICE 2,332,570

GEAR CUTTING MACHINE

Albert A. Grossarth, La Grange, Ill., assignor to Miehle Printing Press & Manufacturing Company, Chicago, Ill., a corporation of Illinois Application March 8, 1940, Serial No. 322,924

17 Claims. (Cl. 90—7)

The invention relates to gear cutting mechanism and has reference particularly to a gear cutting machine for cutting teeth on roll-curve gears such as disclosed and claimed in the Hyman E. Golber Patent No. 2,253,270 issued August 19, 1941, and entitled Gears.

In automatic machinery the movements of the various parts thereof are usually obtained from the motion of a follower impelled or actuated by a driver, the latter ordinarily rotating at a uniform speed, whereas, the follower has some definite motion, usually one of rotation. When the follower motion is rotation at uniform speed the driver and follower can be connected by ordinary circular gears. When the follower motion is variable, including acceleration and deceleration, the problem can be effectively solved by using roll-curve gears. In fact, such gears make it possible to give to the follower or driven gear any desired motion.

The production of roll-curve gears, as more fully explained in the Golber application above referred to, involves first of all the development of a "speedgraf" of the follower from data of the required non-uniform motion; the plotting of roll-curves for both the follower and driving gear; the making of master patterns in accordance with such roll-curves and finally the cutting of the roll-curve gears under the control of said master patterns.

The present invention is particularly concerned with the last operation and has for an object to provide mechanism which will use a conventional gear shaper for forming teeth on roll-curve gears.

Another object of the invention is to provide a novel gear cutting machine which will cut teeth on roll-curve gears under the control of a master pattern or cam having a periphery corresponding to the gear roll-curve and wherein said control will maintain the cutter in proper relation to the pitch line of the gear blank as the gear blank rotates during the operation of the machine and will also effect indexing rotation of the gear cutter as by a rotational drive with a roller frictionally contacting the periphery of said master pattern. In the present machine the gear cutter has rotational indexing movement imparted thereto through a frictional drive from the master pattern for producing the first roll-curve gear and after that the said first gear thus produced can then be used in a machine to provide a positive drive for rotating the cutter.

Another object is to provide a gear cutting machine having a cutter mounted for reciprocating movement and for rotational movement about its center as an axis and which will be locked against rotation during its cutting stroke but released during the return or idle stroke so that the cutter may have free rotational movement to a limited extent, the said releasing action, since it frees the cutter for rotation, preventing possible damage to the gear teeth during the return stroke and also making it possible to rotationally index the cutter during said return stroke.

Another object of the invention is to provide a gear cutting machine of the character described having novel and improved means for alternately locking and releasing the rotational drive to the reciprocating gear cutter and wherein the locking action will take place during the period the drive is inoperative to impart rotational movement to the cutter.

Another object is to provide a gear cutting machine of the character described having a cutter mounted for reciprocating movement and for bodily swinging movement from a parallel operating position for the cutting stroke to an angular position for the return or idle stroke, whereby as a result of said angular position the cutting tool is rendered ineffective with respect to the gear blank.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figures 1, 10, 11, 12:
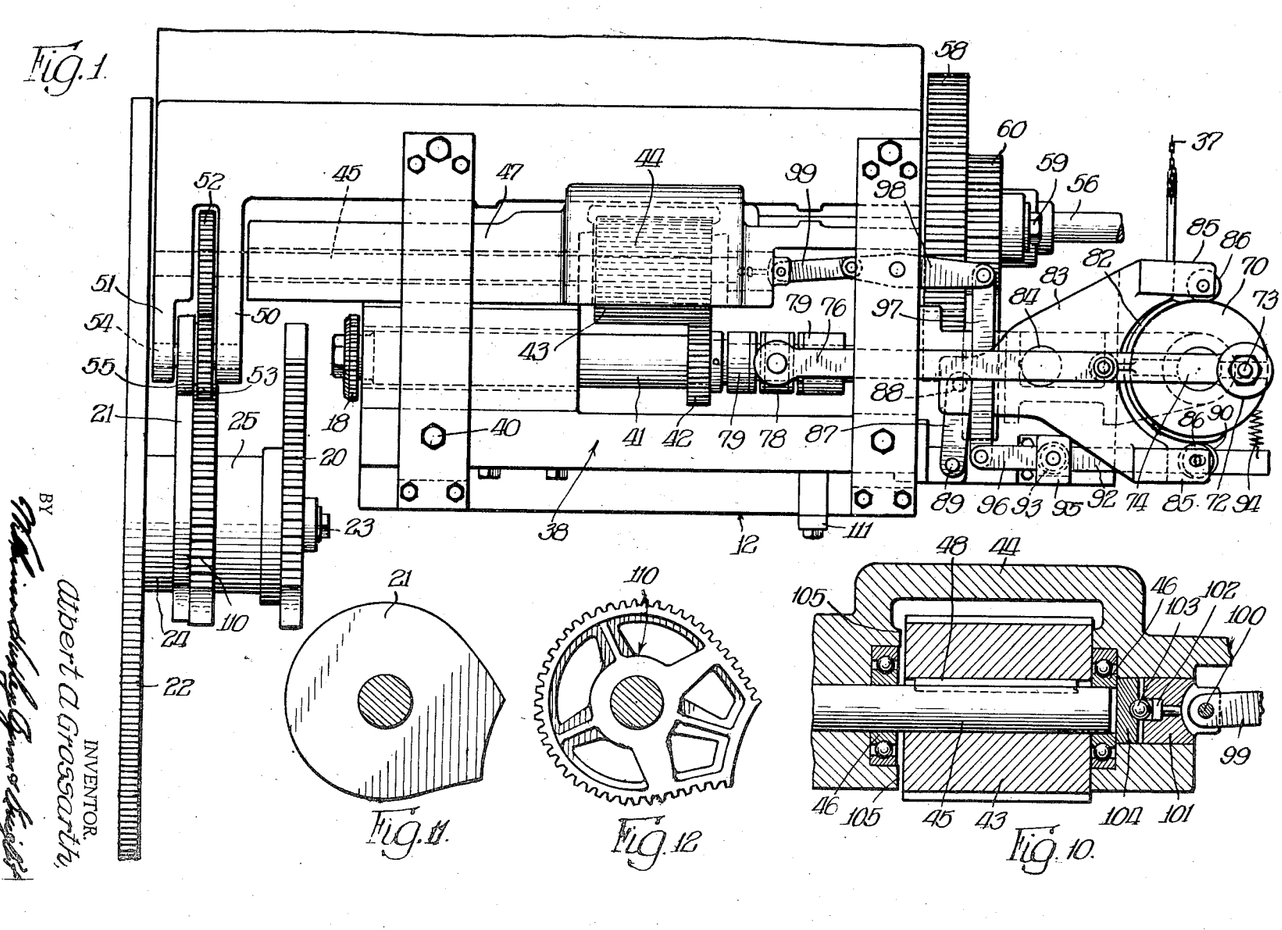
Figure 1 is a top plan view of a gear cutting machine constructed in accordance with the present invention.
Figure 10 is a detail sectional view illustrating the improved means for locking the gear drive to prevent rotational movement of the cutter.
Figure 11 is a plan view of the master pattern or cam used to control the cutting of the teeth on the roll-curve gear shown in Figure 12.
Figure 12 is a plan view of the roll-curve gear.

In the embodiment of the invention illustrated in the drawings the gear cutting machine comprises a base 10 having upstanding trunnions or supports 11 for supporting the movable frame 12 which supports a reciprocating gear shaper in a manner to be particularly explained as the description proceeds. Said movable frame 12 has end portions 13 and 14 which taper at their lower end and are connected by a trunnion member 15 which passes through the trunnion bearings or supports 11, whereby the frame 12 is supported by the base 10 in a manner permitting oscillating or rocking movement of the frame. As clearly shown in Figure 3, the end portion 14 is provided with an outwardly extending arm 16 to which is secured the coil spring 17 for applying a yielding tension to the frame to produce movement of the same on the trunnion 15 in a counterclockwise direction, Figure 3. As a result of the tension applied to the movable frame 12 the reciprocating gear cutter 18, Figure 1, is maintained in proper relation to the roll-curve periphery of the gear blank 20 during the cutting of the teeth thereon. This control is made possible by the use of a master pattern or cam 21, Figure 11, which has a roll-curve periphery identical to that of the gear blank with the exception that the periphery of the master cam corresponds to the pitch line of the roll-curve gear to be formed from the gear blank 20.

Figures 4, 5:
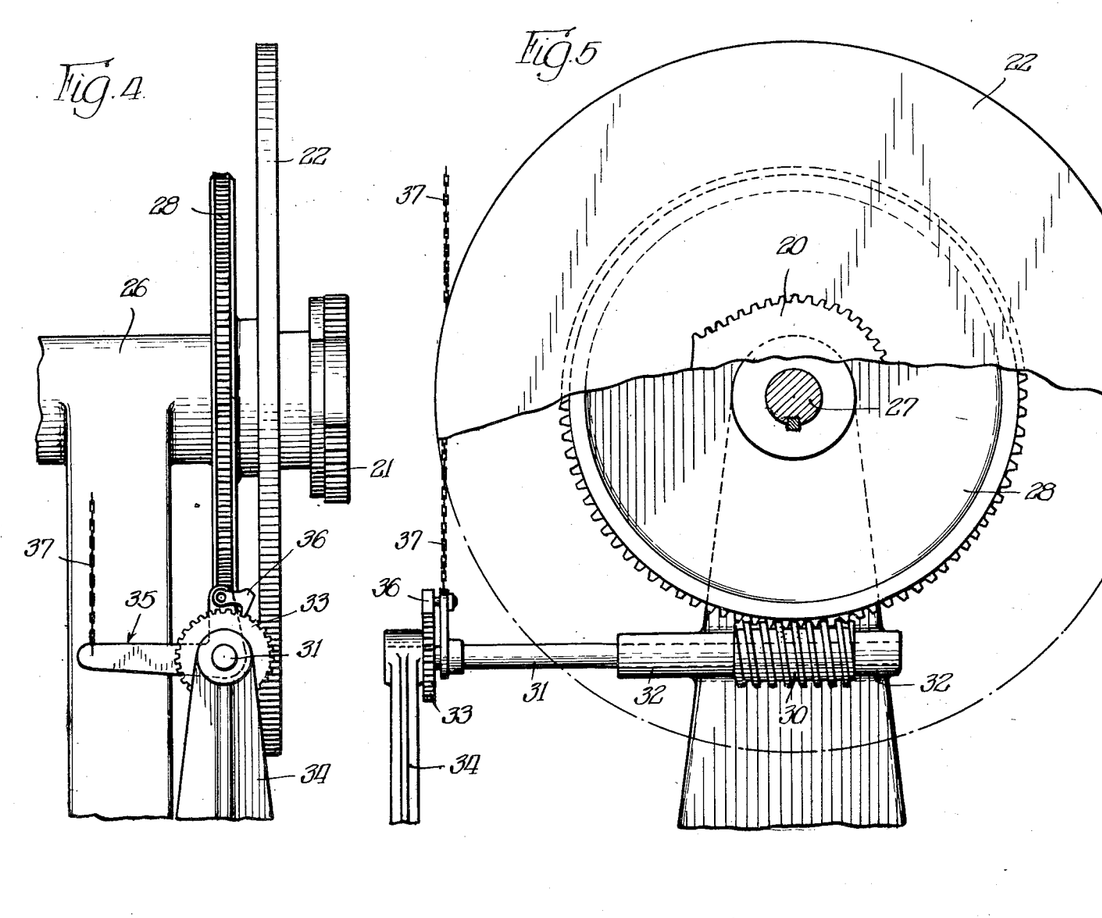
Figure 4 is a fragmentary side elevational view of the left end of the machine showing the intermittent drive for the work holding member.
Figure 5 is a front elevational view of the structure shown in Figure 4 with parts being broken away to more clearly illustrate the drive for the work holding member.

The left end of the machine, as shown in Figure 1, includes a revolving face plate or work holding member 22 and the gear blank 20 and master pattern 21 are secured to said member as by means of the securing bolt 23. The master pattern and gear blank are positioned at the center of the member 22 and in setting up the machine it is absolutely essential that the roll-curve periphery of the gear blank 20 coincide throughout with the roll-curve periphery of the master pattern 21. The master pattern is suitably spaced from the face of member 22 by the sleeve 24 and a similar sleeve 25 is used to space the gear blank. As best shown in Figures 4 and 5 the member 22 is mounted for rotation in the trunnion support 26 and the drive shaft 27 of the member, which is suitably journalled in support 26, has non-rotatably secured thereto a driving gear 28 of relatively large diameter adapted to have meshing engagement with the worm gear 30. Said worm gear is driven by shaft 31 journalled by the bearings 32 and at the outer end of said shaft the ratchet wheel 33 is secured. The end of the shaft beyond the ratchet wheel is suitably supported by an upright 34.

The drive to the work holding member 22 is intermittent, the same taking place through the bell crank 35 rotatably supported on the shaft 31 and carrying at the end of its upright arm a pivoted dog 36 adapted to engage the teeth of the ratchet wheel 33. A chain 37 has connection with the horizontal arm of the bell crank 35 and through said chain the bell crank is intermittently oscillated to give to the work holding member 22 and thus the gear blank 20 the proper increment of rotational movement, which is in timed relation with the reciprocating movement of the gear cutter 18, which will now be described.

The carrier frame 38 is supported on the upper surface 39 of the movable frame 12 and is pivoted to said frame at 40. Said frame carries the reciprocating member 41 to which is secured the gear cutter 18. It will be clear from Figure 1 that reciprocating movement of member 41 will move the cutter transversely across the gear face of the blank 20. A gear 42 is non-rotatably secured to the reciprocating member 41 at the end opposite the cutter 18 and said gear has meshing engagement with gear 43 located within the housing 44. The shaft 45, journalled by bearings in the races 46, positioned at the respective ends of the housing, Figure 10, and by the part 47, comprises the driving shaft for gear 43 which is non-rotatably secured thereto as by the key 48. The drive shaft extends beyond part 47 and through the forwardly extending bifurcated arms 50 and 51 provided by the movable frame 12. The gear 52, located between the arms, is fixed to said shaft and said gear has meshing engagement with pinion 53 on the stud shaft 54 which also carries the roller 55. The roller contacts the roll-curve periphery of the master pattern or cam 21.

The roller 55 is thereby rotated as a result of the frictional engagement between the roller and the master pattern 21 which has intermittent rotational movement corresponding to that of the work holding member 22. From roller 55 movement is imparted to the pinion 53, gear 52, shaft 45 and gear 43, having location within the housing 44. This gear in turn rotates the reciprocating member 41 through contact therewith of the gear 42. The rotational movement thus imparted to the gear cutter 18 conforms to that of roller 55 as the same rolls on the periphery of the master pattern 21.

Figure 6:
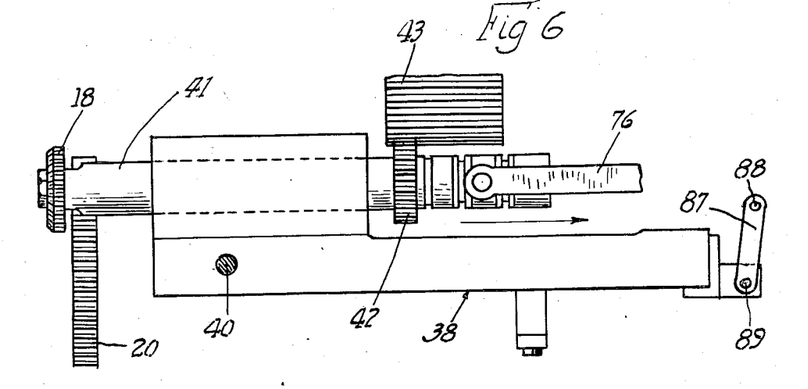
Figure 6 is a fragmentary top plan view showing the supporting frame for the reciprocating cutter in parallel operative position.
Figure 7:
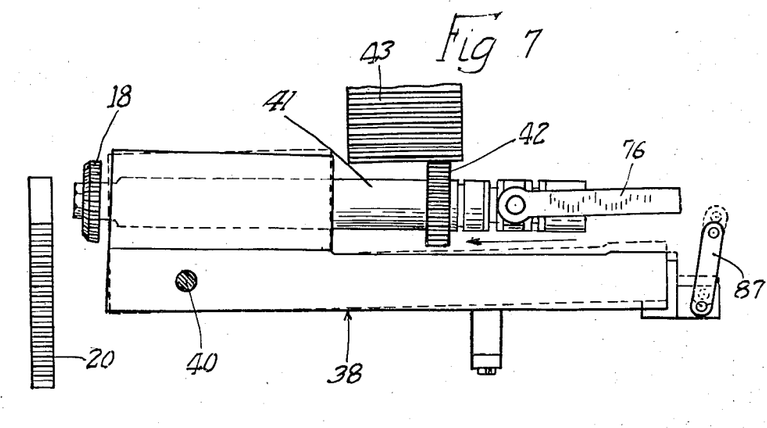
Figure 7 is a view similar to Figure 6 showing the supporting frame for the reciprocating cutter in the angular position assumed during the return or idle stroke.
Figure 8:
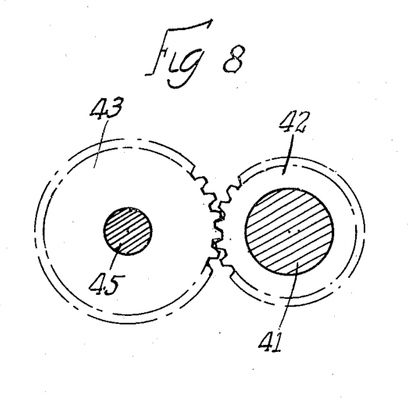
Figure 8 is an enlarged fragmentary view of certain gears in the rotational drive to the cutter showing the close meshing engagement of the same during the cutting stroke.

In addition to the intermittent rotation of member 41 the same has reciprocating movement to move the cutter transversely across the gear face of the blank 20 as previously explained. A cutting stroke takes place upon reciprocation of the member 41 in a direction toward the right, Figure 1. The return or idle stroke is toward the left. During the cutting stroke the invention contemplates that gear 43 will be locked to prevent rotational movement of the same and to also prevent rotary movement of member 41 and thus the gear cutter. However, on the return or idle stroke the gear 43 is released. Also in accordance with the present invention frame 38 is oscillated from a parallel position as shown in Figure 6 to an angular position as shown in Figure 7. The operating instrumentalities for reciprocating member 41, for alternately locking and releasing gear 43, and for oscillating frame 38 will now be described.

Figure 2:
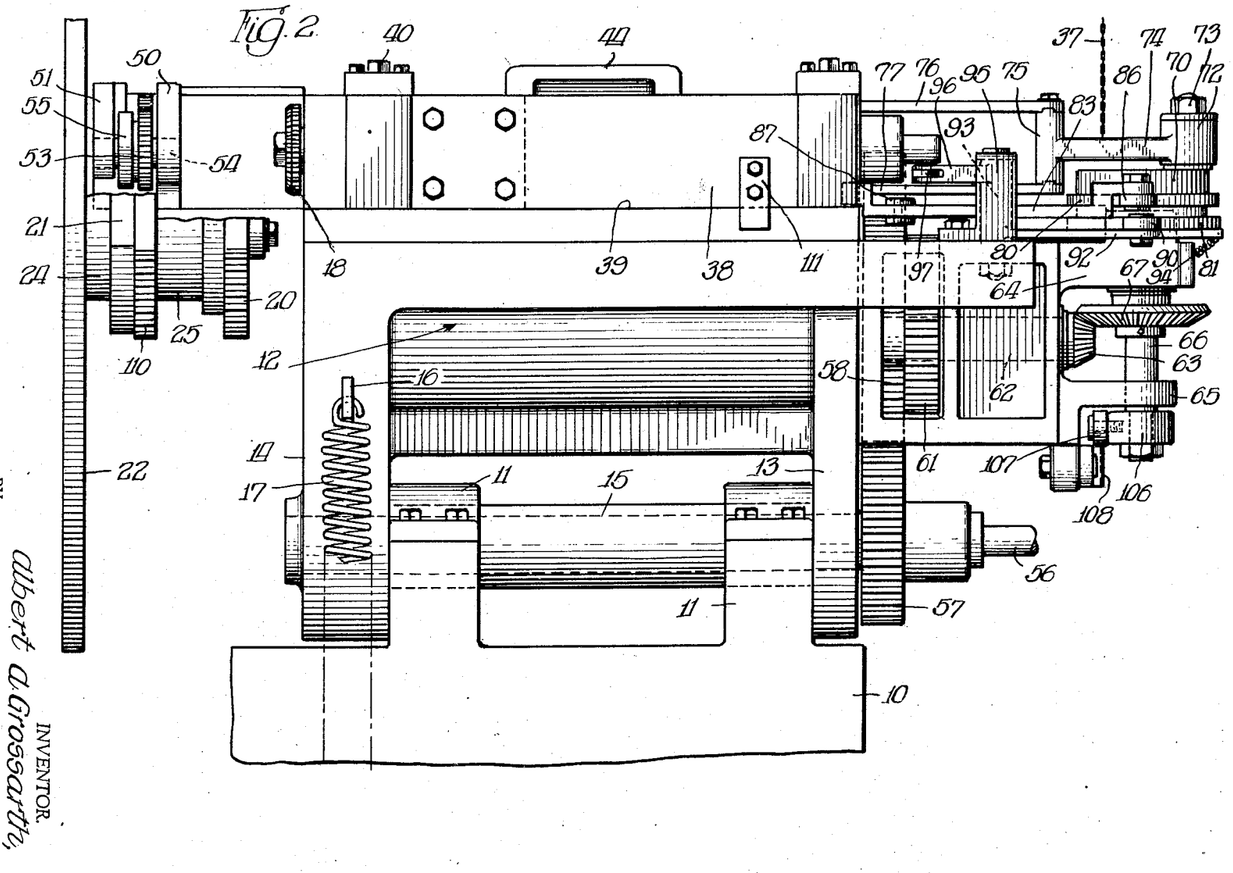
Figure 2 is a side elevational view of the machine shown in Figure 1.

The drive to the present gear cutting machine includes shaft 56, Figure 2, having gear 57 thereon and which shaft is supported at its inner end by the portion 13 of the movable frame 12 concentrically with the trunnion 15. Therefore, oscillating movement of the frame 12 does not interfere with the drive to shaft 56 which is connected in any conventional manner with a source of power such as an electric motor. The gear 58 which rotates on the stud shaft 59 has meshing engagement with gear 57 and the pinion 60 transmits the rotary motion of gear 58 to a companion pinion 61 on the shaft 62 which carries at its outer end a bevel pinion 63. At said end the movable frame 12 provides spaced arms 64 and 65 and said arms provide journalling means for a vertically disposed operating shaft 66. The bevelled gear 67, fixed to said shaft, has meshing engagement with the bevel pinion 63 and accordingly the operating shaft is driven through the gearing described from the drive shaft 56. Said operating shaft controls the reciprocating movement of the gear cutter, the locking and releasing of the gear 43, the oscillating movement imparted to frame 38, and the intermittent driving of the work holding member 22. Therefore, it is easy to synchronize the movement of the various parts so that they operate in proper timed relation with each other.

Figure 3:
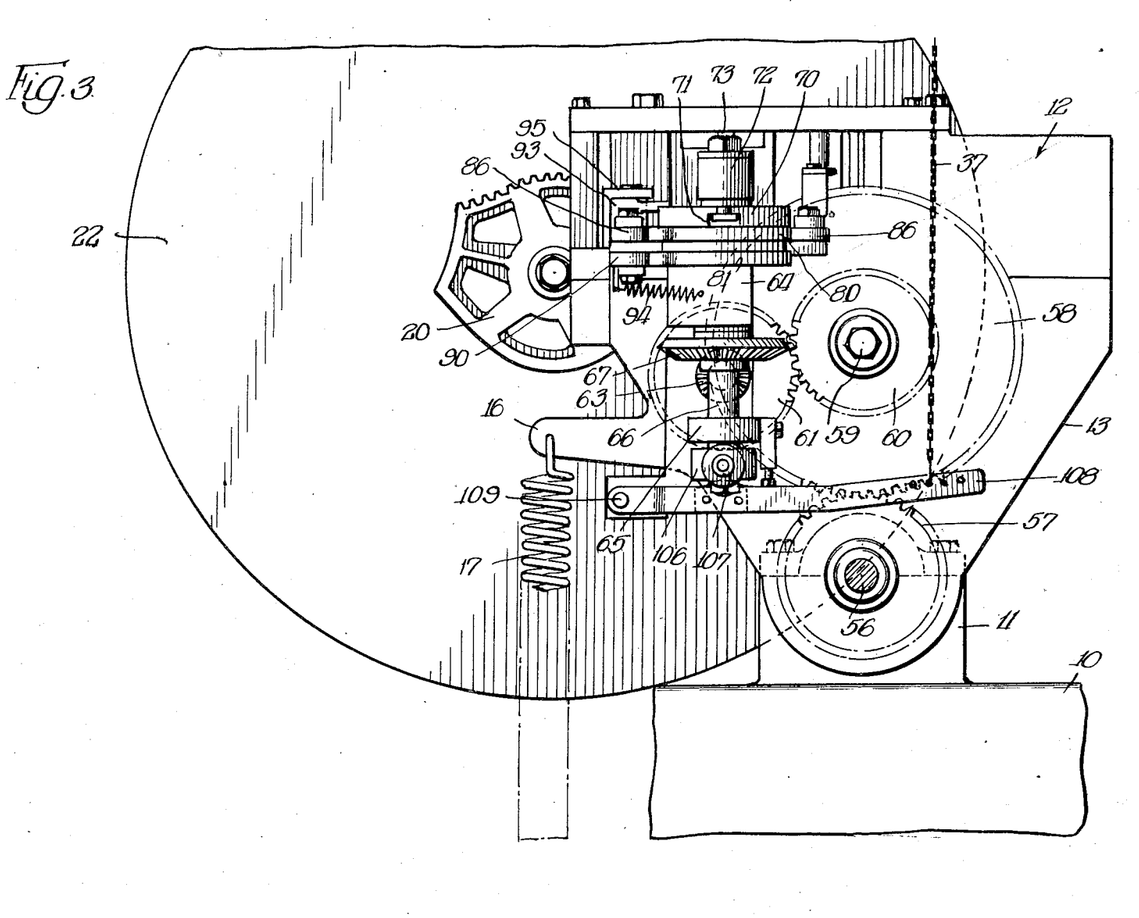
Figure 3 is an elevational view of the right hand end of the machine of Figure 1 showing the operating gears and cams.

The structure for reciprocating member 41 includes a face plate 70, non-rotatably secured to the upper end of the operating shaft 66 and having a diametrical slot 71 in the upper surface thereof, Figure 3, for connecting the eccentric 72 to said plate and which eccentric is adjustable by means of the securing bolt 73 so as to vary the magnitude of the reciprocating movement. The arm 74, extending from said eccentric 72, has a vertical part 75 to which is non-rotatably secured at the upper and lower ends of the same the arms 76 and 77, respectively, which rotatably connect at their other end with the collar 78. Said collar is held on the reduced end portion of member 41 by the companion collars 79 positioned on the respective sides thereof whereby reciprocating movement is imparted to member 41 and said member is also permitted to rotate. By varying the throw of the eccentric 72 the working stroke of the cutter can be varied as desired.

The structure for oscillating the frame 38 and for alternately locking and releasing the gear 43 includes the cams 80 and 81, non-rotatably secured to the operating shaft 66 immediately below the face plate 70. Cam 80 has a cam portion 82, Figure 1, which is instrumental in oscillating the yoke 83, pivoted to the frame 12 as at 84 and having the bifurcated arms 85 carrying rollers 86. The cam portion 82 extends for approximately one-half the periphery of said cam 80 and accordingly when one roller 86 is in contact with the cam portion the other roller is out of engagement with said cam portion. Thus the yoke 83 is oscillated as cam 80 rotates and this oscillation is imparted to frame 38 through the link 87 pivotally connecting with the yoke at 88 and with the frame at 89.

Figure 9:
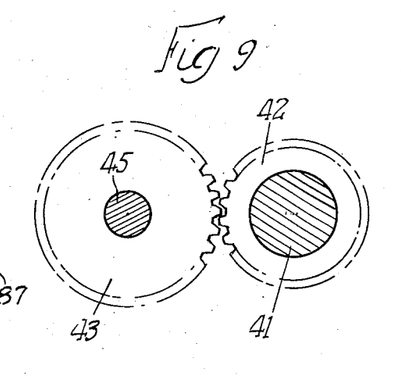
Figure 9 is an enlarged fragmentary view of the same gears shown in Figure 8 but illustrating the loose meshing relation which the gears have during the return or idle stroke of the cutter.

It will be observed by reference to Figures 6 and 7 that the oscillating movement of frame 38 is of limited extent. However, the movement is sufficient to permit the cutter 18 to clear the teeth on the gear blank 20 on its return move-ment. The cutter will be moved in a direction away from the periphery of the gear blank a distance which will just clear the teeth and prevent any damage thereto during the return or idle stroke of the cutter. This oscillating movement of frame 38 has another function which is equally important. This pertains to the locking of the cutter against rotation during its working stroke and the release of the same on the return or idle stroke so that the cutter can be rotated. As previously explained, rotational movement of the cutter is imparted thereto through gear 43 and gear 42. In accordance with the invention gear 43 and thus shaft 45 are locked during the working stroke of the cutter, and since frame 38 on said working stroke is disposed in parallel alignment with gear 43, as shown in Figure 6, gear 42 on the reciprocating member is held in tight meshing contact therewith and the cutter is likewise locked, preventing any rotary movement of the same. On the return stroke of the cutter the frame 38 is moved to an angular position, as shown in Figure 7, and gear 43 is simultaneously released. Although meshing engagement is maintained between gears 42 and 43 there is considerable clearance between the gear teeth as best illustrated in Figure 9. The cutter has sufficient freedom of rotary movement to additionally insure that no damage will be done to the teeth being formed on the gear blank 20 as the cutter moves rearwardly on its return or idle stroke.

Structure for alternately locking and releasing the gear 43 and thus shaft 45, as shown in the drawings, includes the cam 81 having a roller 90 contacting the periphery thereof, said roller being carried by arm 92, having the pintle 93 formed on the inner end thereof, and being resiliently biased by the spring 94 in a direction to maintain the roller in contact with the cam 81. Pintle 93 is suitably journalled on the movable frame 12 by bracket 95 and at its upper end said pintle has an arm 96 projecting in a direction opposite to arm 92. The link 97 connects arm 96 with a toggle joint including lever 98 and link 99, the latter, as shown in Figure 10, pivotally connecting at 100 with the plunger 101. Said plunger is mounted in the right hand end of housing 44 for reciprocating movement and is recessed at its center on its inner face to receive the hardened steel pin 102 which has contact with the hardened steel ball 103. Said ball is also in contact with a hard metal disc 104 whereby axial pressure may be applied to the ball bearing race 46 journalling the right hand end of shaft 45 on which the gear 43 is non-rotatably mounted. Axial pressure on this end of the gear will force the same toward the left until the other end of the gear is in contact with the end surfaces 105 of housing 44. As a result gear 43 can be locked within housing 44 to prevent rotation thereof, which also holds the cutter non-rotatably locked since gear 42 meshes therewith. The alternate locking and releasing of gear 43 is effected by the toggle including lever 98 and link 99 through actuation imparted thereto by cam 81, said cam having a cam portion thereon which in proper timed relation with the reciprocating movement of the cutter cams roller 90 in an outward direction, rocking lever 98 to close the toggle and apply pressure to gear 43.

The portion of the operating shaft 66 depending below arm 65 has non-rotatably fixed thereto a collar 106 carrying a roller 107. Said roller functions as a cam and is adapted to engage arm 108, Figure 3, pivoted to the frame at 109 and having connection with chain 37. During each revolution of the operating shaft 66 arm 108 is cammed downwardly, thereby actuating the chain 37, which chain extends over the machine, being suitably supported by pulleys or the like (not shown) and has connection at its other end to the bell crank 35 as previously explained. This constitutes the drive from the operating shaft to the fact plate 22 comprising the work holding support.

To cut the first roll-curve gear on the present machine a gear blank 20 and a master pattern 21 are locked to the work holding member 22 with the roll-curve periphery of each in accurate alignment. The start of the cutting operation takes place at the upper left end of the blank 20 and said blank is initially positioned with respect to the cutter to properly carry out this operation. Roller 55 is held in frictional engagement with the periphery of the master pattern by the coil spring 17 or the like which applies a yielding tension to the movable frame 12. The work holding member 22 rotates in a counter-clockwise direction, Figure 5, and the roller 55 therefore has rolling contact on the periphery of the master pattern, thereby maintaining the gear cutter 18 in proper relation to the roll-curve periphery of the gear blank. Cutting of the gear teeth is effected by the reciprocating movement of the cutter which has a cutting stroke in one direction and a return or idle stroke in the opposite direction. During the cutting stroke, which is in a direction toward the right with respect to the illustrated embodiment of the invention, the carrier frame 38 will be located in a parallel position, as shown in Figure 6, and the toggle will also be operatively positioned to apply axial pressure to the gear 43 to thus lock the gear and shaft 45, preventing any rotational movement of these parts and of the cutter 18.

The elements above mentioned remain in operative position until the cutter has reached the end of its cutting stroke, whereupon the cutter will be located as shown in Figure 1. At this point in the operation the carrier frame 38 is oscillated by the cam 80 through yoke 83 and connecting linkage to position the frame in an angular position as shown in full lines in Figure 7 and substantially simultaneously therewith cam 81 through connecting linkage will actuate the toggle to release pressure on gear 43, thereby rendering said gear and shaft 45 free to rotate. During return or idle stroke of the cutter the same will therefore be angularly positioned with respect to the gear face of the blank 20 so as to render the cutter ineffective during this return stroke. This angular positioning of the carrier frame 38 also provides clearance between gear 42 and gear 43, as will be clearly understood by reference to Figure 9, and as a result of this clearance the cutter is free so that rotation of the same is possible and this also prevents any possible damage to the gear teeth during the return stroke of the cutter.

Driving of the work holding member 22 also takes place during this return or idle stroke and which is initiated by the roller 107 rotated by the operating shaft 66. Through the roller cam, the arm 108, and the chain 37 actuation is imparted to the bell crank 35 and ratchet wheel 33. The degree of movement imparted to the work holding member for any one actuation of the chain 37 is extremely slight, it being observed that movement of the dog 36 is limited and this is further reduced by the gear reduction including the worm drive to the work holding member. However, as the operation of the machine continues progressive rotation will be imparted to the world holding member and thus to the master pattern and gear blank. The intermittent rotational movement of the master pattern is imparted to the roller 55 and the drive from said roller to the gear cutter takes place through shaft 45, gear 43 and gear 42. Rotational movement of the gear 43 therefore occurs during the idle stroke of the same since during this stroke the gear and also shaft 45 are free, having been released at the beginning of the stroke by actuation of the toggle as previously explained.

It has been explained that the cutter is rotated from said rotational drive during the idle or return stroke. Although the gear 43 is indexed by the roller 55 during this stroke, rotational movement is not imparted to the cutter due to the clearance between the teeth of gear 43 and 42 resulting from the angular positioning of the carrier frame 38. The toggle is actuated following indexing of the rotational drive in order to lock gear 43 in position and the next operation is oscillation of frame 38 to parallel position. This brings the gears 42 and 43 into close meshing contact and the effect is an indexing of the cutter as gear 42 will follow the changed position of gear 43, however slight.

During the cutting stroke the cutter is properly positioned with respect to the gear blank and is accordingly effective to perform a cutting operation, progressively shaping the teeth on the gear blank as the operation of the machine continues. When the first roll-curve gear has been completed said gear, identified by numeral 110, Figure 12, can be used to augment the frictional drive between the master pattern 21 and the roller 55. The gear is suitably secured to the work holding member 22 and its roll curve periphery is aligned with the bell crank and said master cam as previously explained. With the gear added to the machine the rotational drive to the cutter includes the pinion 53, which is fixed to stud shaft 54 also carrying the roller 55. The teeth on pinion 53 mesh with the teeth on the roll-curve gear and instead of a frictional drive to the cutter a positive gear drive is made possible.

What is claimed is:

1. In a gear cutting machine, the combination with a work holding member having intermittent rotary movement, and a gear blank and master pattern held by said member in aligned relation, of a gear cutter for shaping teeth on said gear blank, said gear cutter being mounted for reciprocation transversely of the gear face of the blank and for rotation about its center as an axis, means reciprocating said cutter, rotational drive means for imparting indexing rotation to the cutter in synchronism with movement of the master pattern and thus the gear blank, said rotational drive means including a roller having frictional contact with the periphery of the master pattern and thereby rolling on said master pattern as the same rotates, and means intermittently rotating the work holding member in timed relation with the reciprocating movements of said cutter.

2. In a gear cutting machine, the combination with a work holding member having intermittent rotary movement, and a gear blank and master pattern held by said member in aligned relation, of a gear cutter for shaping teeth on said gear blank, said gear cutter being mounted for reciprocation transversely of the gear face of the blank and for rotation about its center as an axis, means reciprocating said cutter, rotational drive means for imparting indexing rotation to the cutter in synchronism with movement of the master pattern and thus the gear blank, said drive means including a roller having frictional contact with the periphery of the master pattern and thereby rolling on said master pattern as the same rotates, and other means having intermittent actuation to lock said drive means to prevent rotational movement thereof, said other means having a locking action during the cutting stroke of the gear cutter and a releasing action during the return stroke of the same whereby the cutter may be rotated during said stroke.

3. In a gear cutting machine, the combination with a work holding member having intermittent rotary movement, and a gear blank and master pattern held by said member in aligned relation, of a gear cutter for shaping teeth on said gear blank, said gear cutter being mounted for reciprocation transversely of the gear face of the blank and for rotation about its center as an axis, means reciprocating said cutter, drive means having operative connection with the cutter during reciprocation in both directions for imparting indexing rotation to the cutter in synchronism with movement of the master pattern and thus the gear blank, said drive means including a roller having frictional contact with the periphery of the master pattern and thereby rolling on said master pattern as the same rotates, and means acting through said drive means for locking the cutter to prevent rotational movement thereof, said means having actuation intermittently for locking the cutter during a cutting stroke only whereby during the return stroke the cutter may be rotated by the said drive means.

4. In a gear cutting machine, the combination with a work holding member having intermittent rotary movement, and a gear blank and master pattern held by said member in aligned relation, of a gear cutter for shaping teeth on said gear blank, said gear cutter being mounted for reciprocation transversely of the gear face of the blank and for rotation about its center as an axis, means reciprocating said cutter, drive means having a geared connection with the cutter during reciprocation in both directions for imparting indexing rotation to the cutter in synchronism with movement of the master pattern and thus the gear blank, said drive means including a roller having frictional contact with the periphery of the master pattern and thereby rolling on the master pattern as the same rotates, means acting through said drive means for locking the cutter to prevent rotational movement thereof, and other means actuating said foregoing means in timed relation with each other whereby the cutter is locked during the cutting stroke and released during the return stroke so that the same may be rotated by the drive means.

5. In a gear cutting machine, the combination with a reciprocating gear cutter having reciprocation for shaping gear teeth and also being mounted for rotary movement about its center as an axis, rotational driving means having operative connection with the cutter during reciprocation in both directions, a work holding member carrying a gear blank and adapted to have rotational movement, said drive means receiving movement from the work holding member and transmitting the same to the cutter whereby the rotational movements of the parts are synchronized, and other means associated with the driving means and acting through said driving means for alternately locking the cutter against rotation and releasing the same, said other means effecting a releasing action when the driving means is operative to impart rotational movement to the cutter and effecting a locking action during the period the driving means is inoperative.

6. In a gear cutting machine, a rotatable work holding member carrying a gear blank and a master pattern in aligned relation with each other, a gear cutter for shaping teeth on said gear blank, means mounting the gear cutter for reciprocating movement and for rotational movement about its center as an axis, a frame for said mounting means constructed and arranged whereby relative movement between the frame and the work holding member will vary the position of the cutter with respect to the gear face of the blank, a rotational drive on said frame having operative connection with the cutter during reciprocation in both directions, said drive including a roller held in frictional engagement with and having rolling contact on the periphery of the master pattern as the same rotates, whereby relative movement between the frame and work holding member to maintain the gear cutter in proper relation with the gear blank will take place under the control of the master pattern, and whereby said master pattern will also control rotation of the roller and thus the gear cutter through said rotational drive.

7. In a gear cutting machine, a rotatable work holding member carrying a gear blank and a master pattern in aligned relation with each other, a gear cutter for shaping teeth on said gear blank, means mounting the gear cutter for reciprocating movement and for rotational movement about its center as an axis, a frame for said mounting means constructed and arranged whereby relative movement between the frame and the work holding member will vary the position of the cutter with respect to the gear face of the blank, a rotational drive on said frame having a geared connection with the cutter during reciprocation in both directions, said drive including a roller held in frictional engagement with and having rolling contact on the periphery of the master pattern as the same rotates, whereby relative movement between the frame and work holding member to maintain the gear cutter in proper relation with the gear blank will take place under the control of the master pattern, and whereby said master pattern will also control rotation of the roller and thus the gear cutter through said rotational drive, means intermittently rotating said work holding member, other means for reciprocating the gear cutter, and means actuating said foregoing means in timed relation.

8. In a gear cutting machine, a rotatable work holding member, a movable frame associated therewith and carrying a reciprocating gear cutter for shaping teeth on a gear blank held by said member, a master pattern also held by said member in aligned relation with the gear blank, rotational drive means on the frame operatively connecting with the cutter during reciprocation in both directions, a roller forming part of said drive means and having contact with the periphery of the master pattern, and means yieldingly tensioning the movable frame to frictionally hold the roller in contact with the master pattern, whereby the roller has rolling contact on the master pattern as the same rotates to thereby control rotational movement of the cutter imparted thereto through said driving means and movement of the frame for properly positioning the cutter with respect to the gear face of the blank.

9. In a gear cutting machine, a rotatable work holding member carrying a gear blank and a master pattern in aligned relation with each other, a gear cutter for shaping teeth on said gear blank, an oscillatable frame mounting the gear cutter for reciprocating movement and for rotational movement about its center as an axis, rotational driving means for the cutter including a roller held in frictional contact with the periphery of the master pattern whereby rotational movement of the master pattern is imparted to the roller and thus to the cutter to index the same, means reciprocating the cutter, and other means for oscillating said frame in timed relation with the reciprocating movement of the cutter.

10. In a gear cutting machine, a rotatable work holding member carrying a gear blank and a master pattern in aligned relation with each other, a gear cutter for shaping teeth on said gear blank, an oscillatable frame mounting the gear cutter for reciprocating movement and for rotational movement about its center as an axis, rotational driving means having a geared connection with the cutter during reciprocation in both directions including a roller held in frictional engagement with and having rolling contact on the periphery of the master pattern as the same rotates, whereby rotational movement is imparted to the cutter through the driving means to index the cutter, means for reciprocating the cutter, and other means for oscillating the frame in timed relation with said reciprocating movement, said oscillating movement of the frame positioning the cutter substantially parallel with the gear face of the blank during a cutting stroke and angularly positioning the cutter during the return stroke to render the same ineffective with respect to the gear blank.

11. In a gear cutting machine, a rotatable work holding member carrying a gear blank and a master pattern in aligned relation with each other, a gear cutter for shaping teeth on said gear blank, an oscillatable frame mounting the gear cutter for reciprocating movement and for rotational movement about its center as an axis, rotational driving means having a geared connection with the cutter during reciprocation in both directions including a roller held in frictional engagement with and having rolling contact on the periphery of the master pattern as the same rotates, whereby rotational movement is imparted to the cutter through the driving means to index the cutter, means for reciprocating the cutter, means rotating the work holding member intermittently, and other means oscillating the frame to position the cutter substantially parallel with the gear face of the blank during a cutting stroke and to angularly position the cutter during a return stroke so as to render the same ineffective with respect to the gear blank, all of said means having actuation in timed relation with each other.

12. In a gear cutting machine, a gear cutter for shaping teeth on a gear blank, an oscillatable frame mounting the cutter for reciprocating movement and for rotational movement about its center as an axis, rotational driving means for indexing the cutter having a geared connection therewith during reciprocation in both directions, means oscillating the frame in timed relation with the reciprocating movement of the cutter to position the cutter substantially parallel with the gear face of the blank during a cutting stroke and to angularly position the cutter during return stroke so as to render the same ineffective with respect to the gear blank, said oscillating movement of the frame to angularly position the cutter providing clearance in the geared connection between the cutter and the rotational driving means, thereby permitting movement of the cutter to the extent of said clearance, whereby said cutter is additionally rendered ineffective during a return stroke and damage to the gear teeth during said stroke is prevented.

13. In a gear cutting machine, a rotatable work holding member carrying a gear blank and a master pattern in aligned relation with each other, a gear cutter for shaping teeth on said gear blank, an oscillatable frame mounting the gear cutter for reciprocating movement and for rotational movement about its center as an axis, rotational driving means for indexing the cutter including a roller held in frictional engagement with and having rolling contact on the periphery of the master pattern as the same rotates, a geared connection between the driving means and the cutter operatively connecting the parts during reciprocation in both directions, means oscillating the frame in timed relation to the reciprocations of the cutter to position the cutter substantially parallel with the gear face of the blank during a cutting stroke and to angularly position the cutter during a return stroke so as to render the same ineffective with respect to the gear blank, said oscillating movement of the frame to angularly position the cutter providing clearance in said geared connection, thereby permitting movement of the cutter to the extent of said clearance, whereby the cutter is additionally rendered ineffective during the return stroke and damage to the gear teeth during said stroke is prevented.

14. In a gear cutting machine, a gear cutter for shaping teeth on a gear blank, an oscillatable frame mounting the gear cutter for reciprocating movement and for rotational movement about its center as an axis, driving means for rotationally indexing the cutter including gears having meshing engagement and operatively connecting the cutter with said means during reciprocating movement in both directions, means for oscillating the frame to position the cutter substantially parallel with the gear face of the blank during a cutting stroke and to angularly position the cutter during a return stroke, said oscillating movement of the frame to angularly position the cutter providing clearance in said geared connection to thereby permit free rotational movement of the cutter to the extent of said clearance, and oscillating movement of said frame to position the cutter substantially parallel during a cutting stroke eliminating said clearance and causing said gears to have close meshing contact.

15. In a gear cutting machine, a gear cutter for shaping teeth on a gear blank, an oscillatable frame mounting the gear cutter for reciprocating movement and for rotational movement about its center as an axis, driving means for rotationally indexing the cutter including gears having meshing engagement and operatively connecting the cutter with said means during reciprocating movement in both directions, means for oscillating the frame to position the cutter substantially parallel with the gear face of the blank during a cutting stroke and to angularly position the cutter during a return stroke, said oscillating movement of the frame to angularly position the cutter providing clearance in said geared connection to thereby permit free rotational movement of the cutter to the extent of said clearance, the oscillating movement of said frame to position the cutter substantially parallel during a cutting stroke eliminating said clearance and causing said gears to have close meshing contact, and other means acting through said drive means for locking the cutter to prevent indexing rotation, said other means having intermittent actuation to effect a locking action during a cutting stroke and a releasing action during a return stroke of the cutter.

16. In a machine incorporating a gear tooth cutter for generating and cutting the teeth of irregular gears, the combination with a gear blank and a master cam having a contour conforming to the pitch curve of the gear to be formed on the gear blank, of means for reciprocating the cutter to cut teeth on the gear blank, other means for rotating said cutter on its axis, said other means including a roller held against the cam contour of the master cam and revolved thereby, drive connections between the roller and the cutter, and means rotating the master cam and said gear blank in unison and intermittently with respect to the teeth-cutting operations so as to alternate with the teeth-cutting operations, whereby the cutter is alternately rotated and is positioned between rotations during the cutting stroke of the cutter so as to conform to the position of the roller relative to the axis of the master cam.

17. The method of generating and cutting teeth of irregular gears which consists in intermittently rotating in unison a gear blank and a master cam having a cam contour conforming to the pitch curve of the gear to be formed on the gear blank, reciprocating a gear tooth cutter transversely across the face of the gear blank to cut teeth thereon during each interval the gear blank is at rest, bodily oscillating the cutter at the start of the return reciprocating movement to provide clearance between the cutter and the teeth being formed on the gear blank, returning said cutter to its initial operative position at the end of the return reciprocating stroke, rotating the cutter on its axis substantially simultaneously with said returning oscillating movement, and finally locking the cutter to prevent rotation during the cutting stroke thereof, whereby the cutter is intermittently rotated and between rotations is securely held in a position conforming to the teeth being generated on the gear blank.

ALBERT A. GROSSARTH.